US007903139B2

(12) United States Patent
Cornejo

(10) Patent No.: US 7,903,139 B2
(45) Date of Patent: Mar. 8, 2011

(54) DEVICE FOR PRODUCING THREE-DIMENSIONALLY-PERCEIVED IMAGES ON A MONITOR WITH MULTIPLE LIQUID CRYSTAL SCREENS

(76) Inventor: Adrian G. Cornejo, Mexico City (MX)

( * ) Notice: Subject to any disclaimer, the term of this patent is extended or adjusted under 35 U.S.C. 154(b) by 1685 days.

(21) Appl. No.: 10/536,893

(22) PCT Filed: Jun. 10, 2003

(86) PCT No.: PCT/MX03/00048
§ 371 (c)(1),
(2), (4) Date: May 27, 2005

(87) PCT Pub. No.: WO2004/051309
PCT Pub. Date: Jun. 17, 2004

(65) Prior Publication Data
US 2005/0285962 A1   Dec. 29, 2005

(30) Foreign Application Priority Data
Nov. 29, 2002  (MX) ............... PA/U/2002/000341 U

(51) Int. Cl.
*H04N 13/02*   (2006.01)
(52) U.S. Cl. ............... 348/46; 348/51; 348/50; 348/49; 348/53; 348/54; 348/55; 348/59; 348/42
(58) Field of Classification Search ............... 348/46, 348/51, 50, 49, 53, 54, 55, 59, 42
See application file for complete search history.

(56) References Cited

U.S. PATENT DOCUMENTS

| 4,396,944 | A | * | 8/1983 | McKenney et al. | ........... 348/141 |
| 6,057,898 | A | | 5/2000 | Itoh et al. | |
| 6,597,397 | B1 | * | 7/2003 | Stephenson et al. | ..... 348/231.99 |
| 7,619,585 | B2 | * | 11/2009 | Bell et al. | ........................... 345/9 |
| 2002/0159032 | A1 | | 10/2002 | Son et al. | |

FOREIGN PATENT DOCUMENTS
WO   WO 01/23908   4/2001

* cited by examiner

*Primary Examiner* — Shawn An
(74) *Attorney, Agent, or Firm* — Richard C. Litman

(57) ABSTRACT

The invention relates to a device which is used to film, record and reproduce video images in real time with a three dimensional appearance, using a video camera and a sonar system in order to obtain the depth information. According to the invention, an electronic system divides up the original image filmed in BGR format and each image is modified in accordance with the depth register (or programming) in order to form new images. Each image corresponds to a determined distance level. The result is displayed on a monitor comprising various independent transparent LCD (liquid crystal display) screens which are aligned one after the other. By displaying the images simultaneously, a single image is formed for the spectator, said image creating an appearance of volume and three-dimensional perception similar to low relief. The depth, video and sound signals are transmitted directly for reproduction purposes and to the magnetic tape recording system for storage purposes, using three magnetic tape heads.

2 Claims, 11 Drawing Sheets

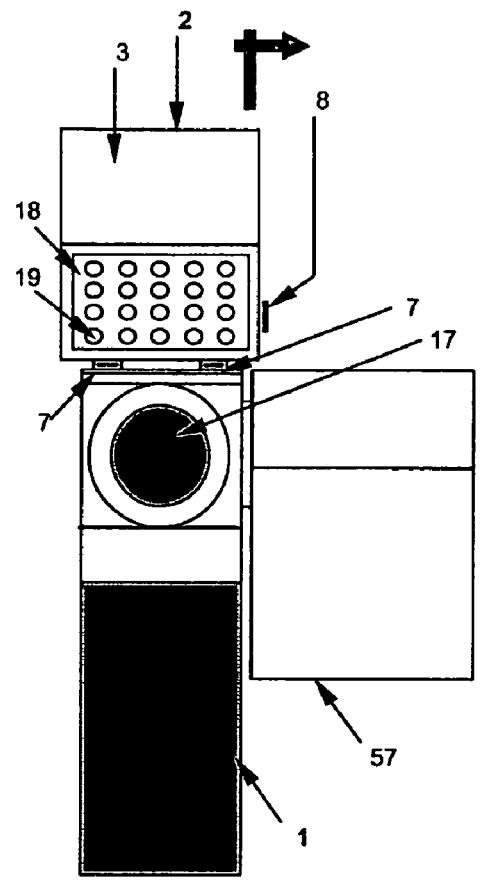
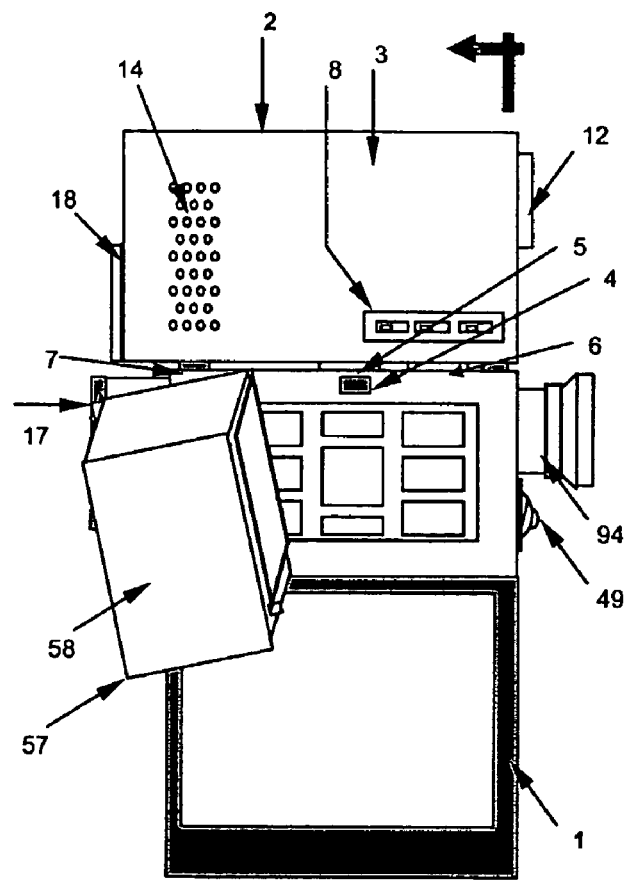
Figura 1  Figura 2

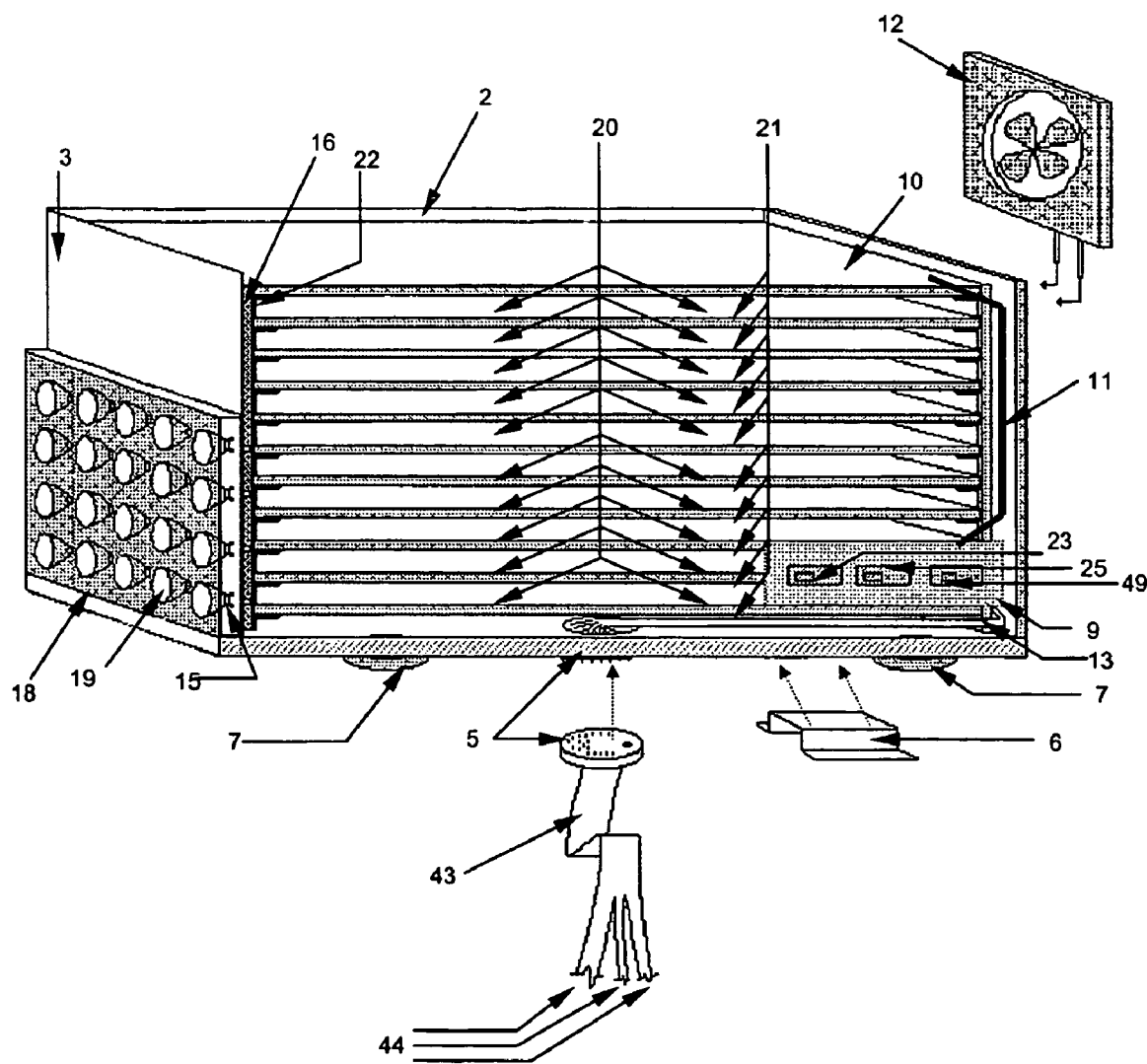
Figura 3

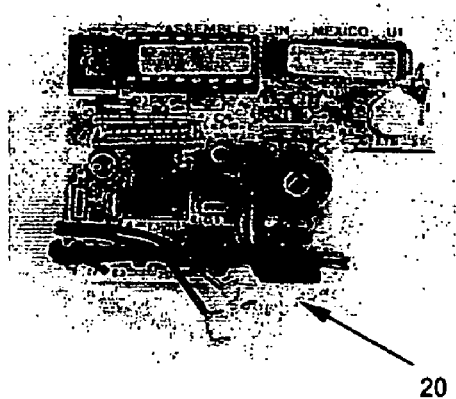
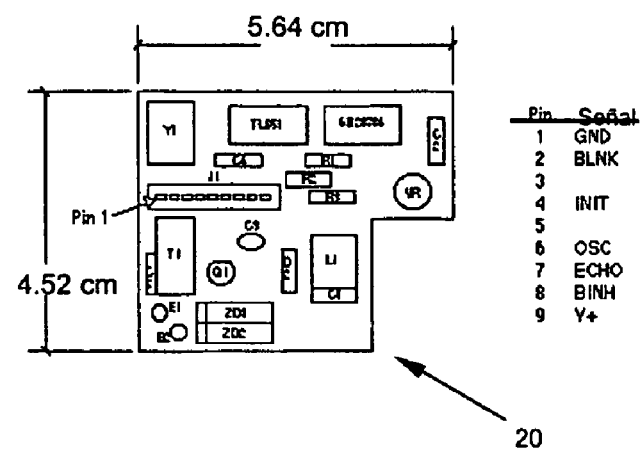
Figura 4  Figura 5

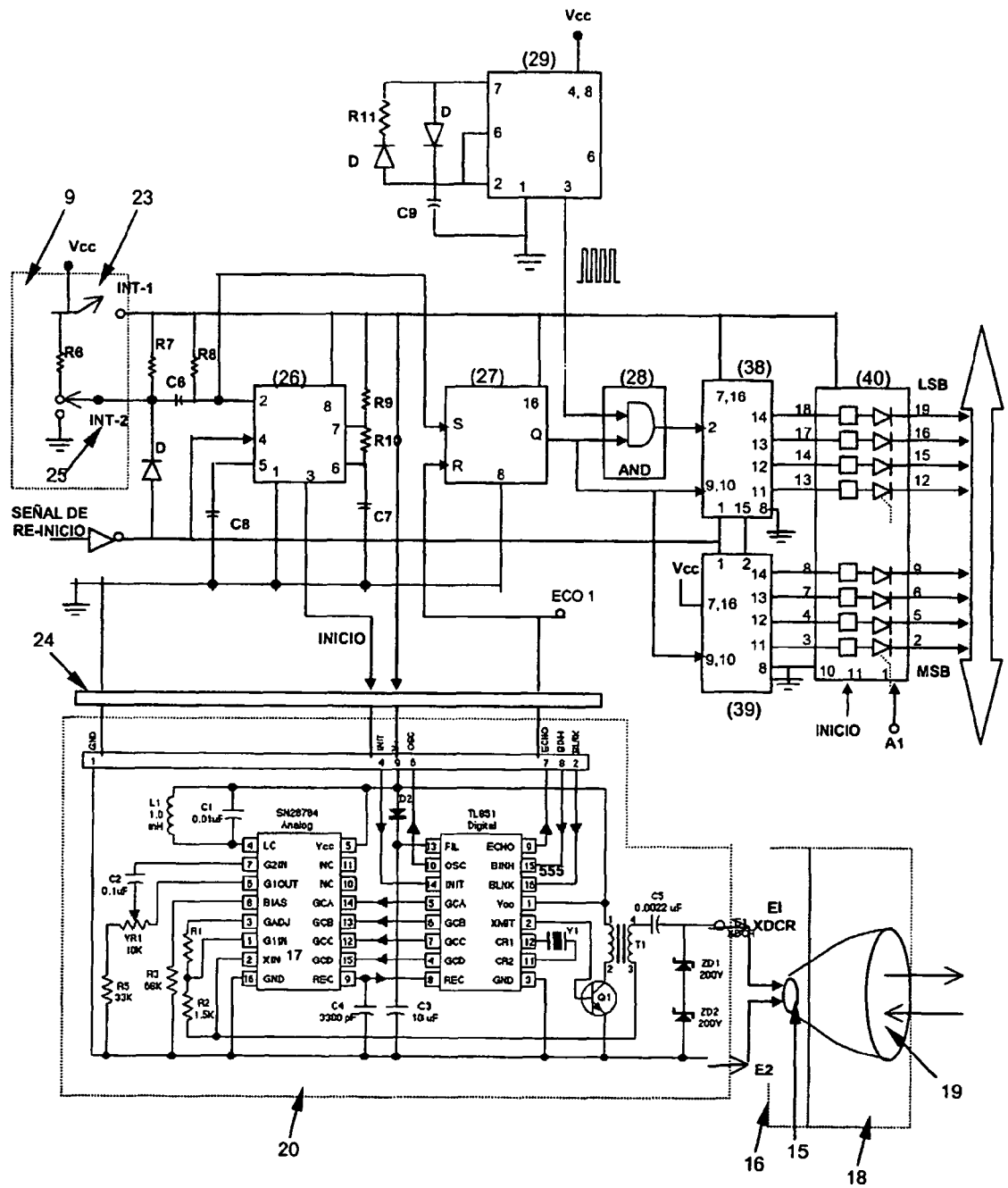
Figura 6

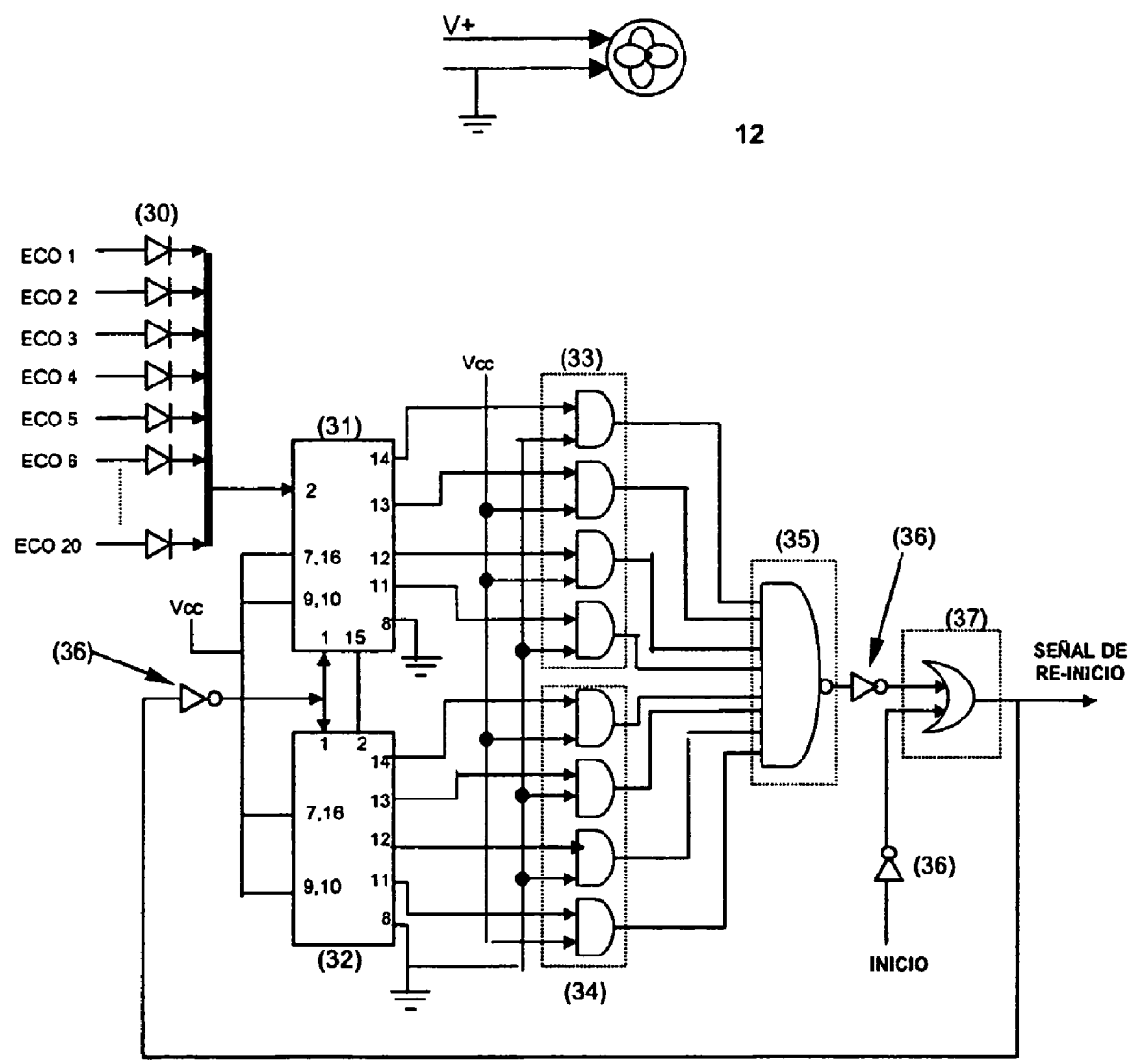
Figura 7

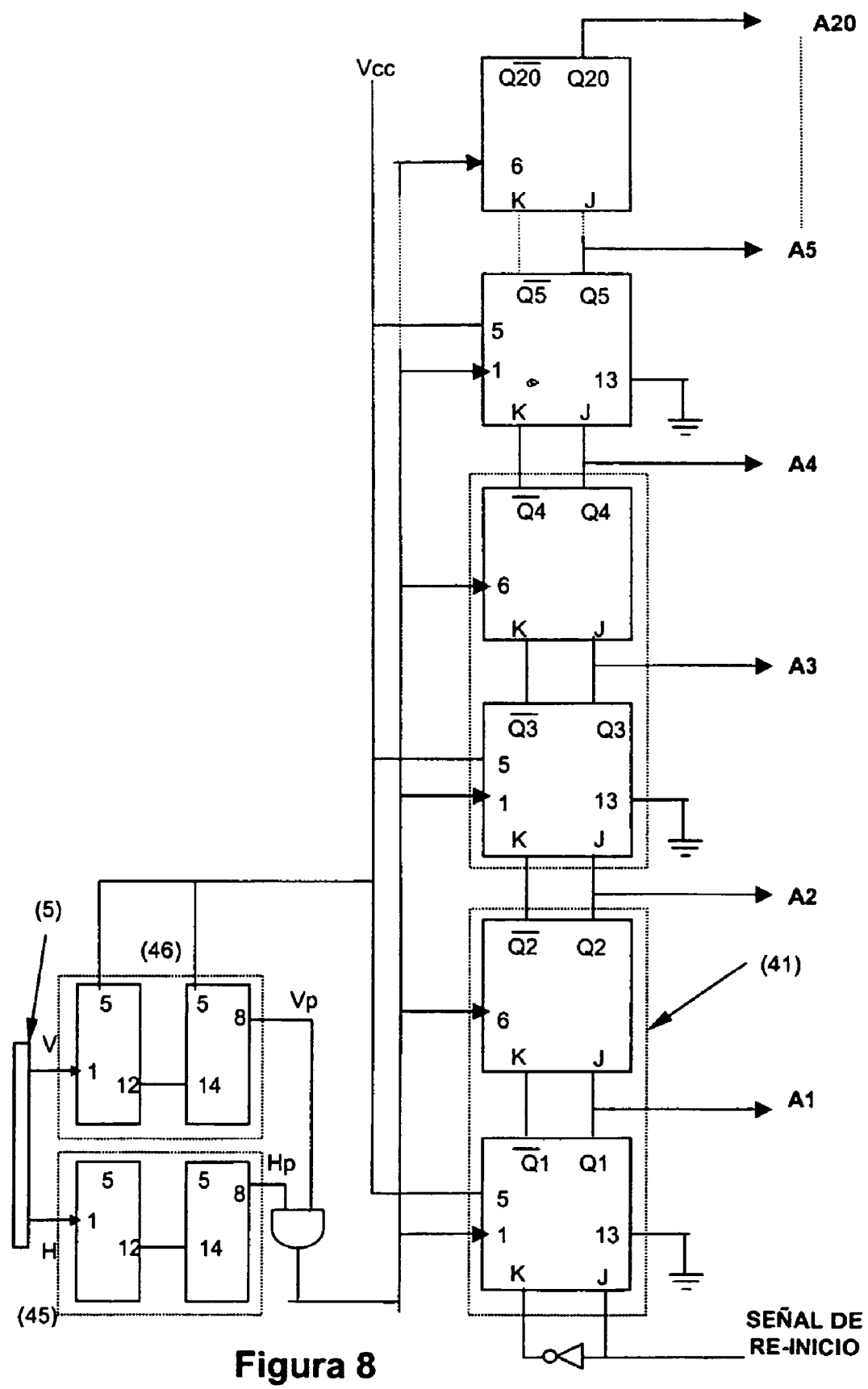
Figura 8

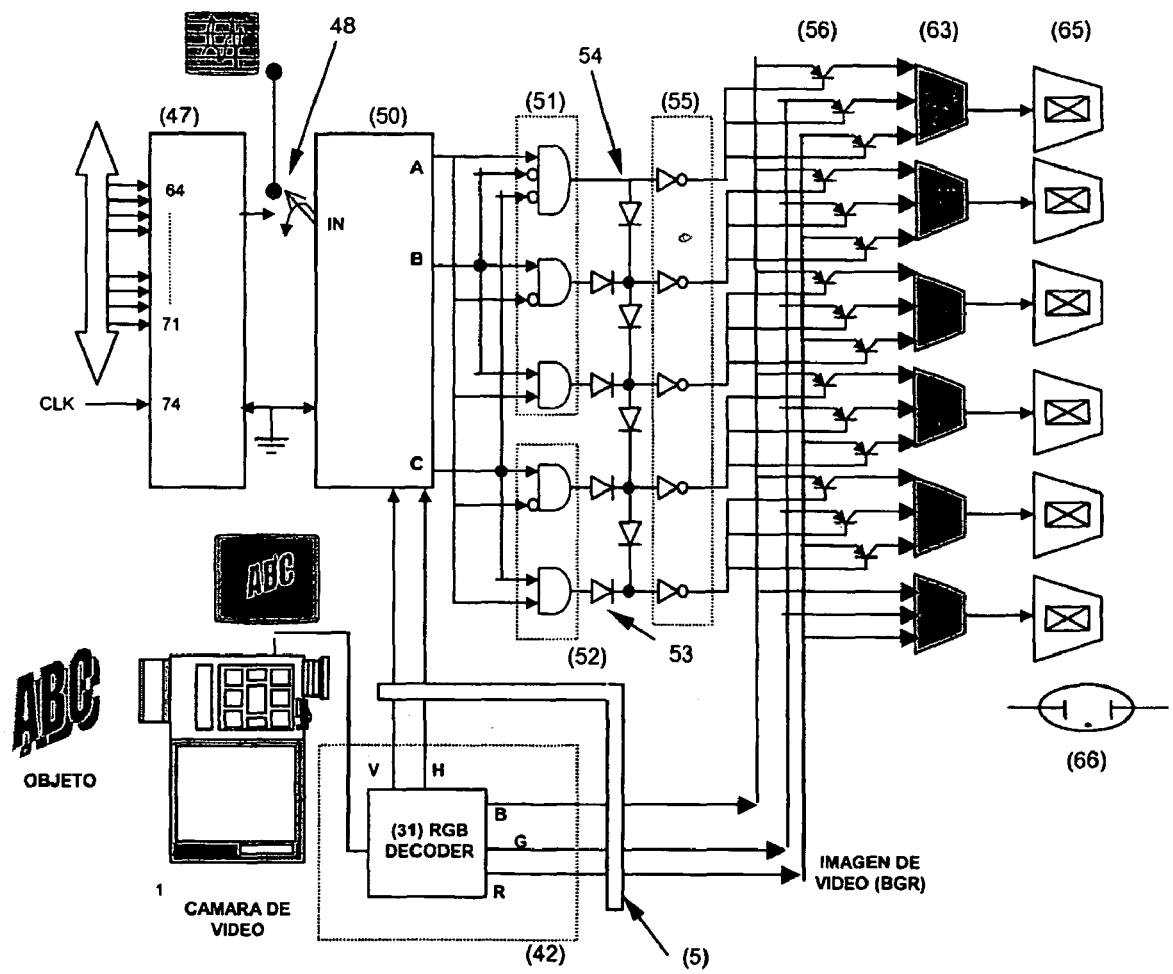
Figura 9

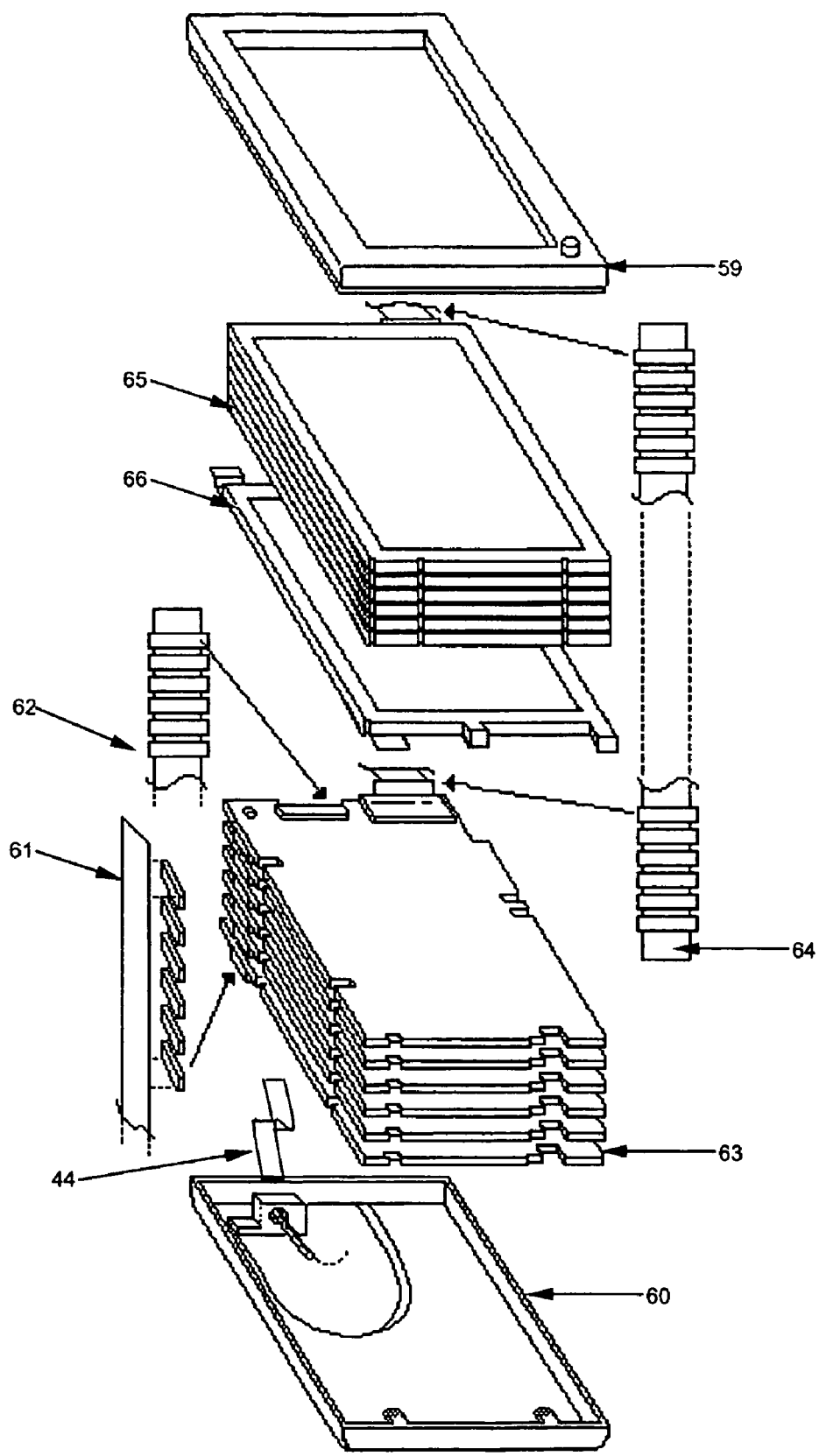
Figura 10

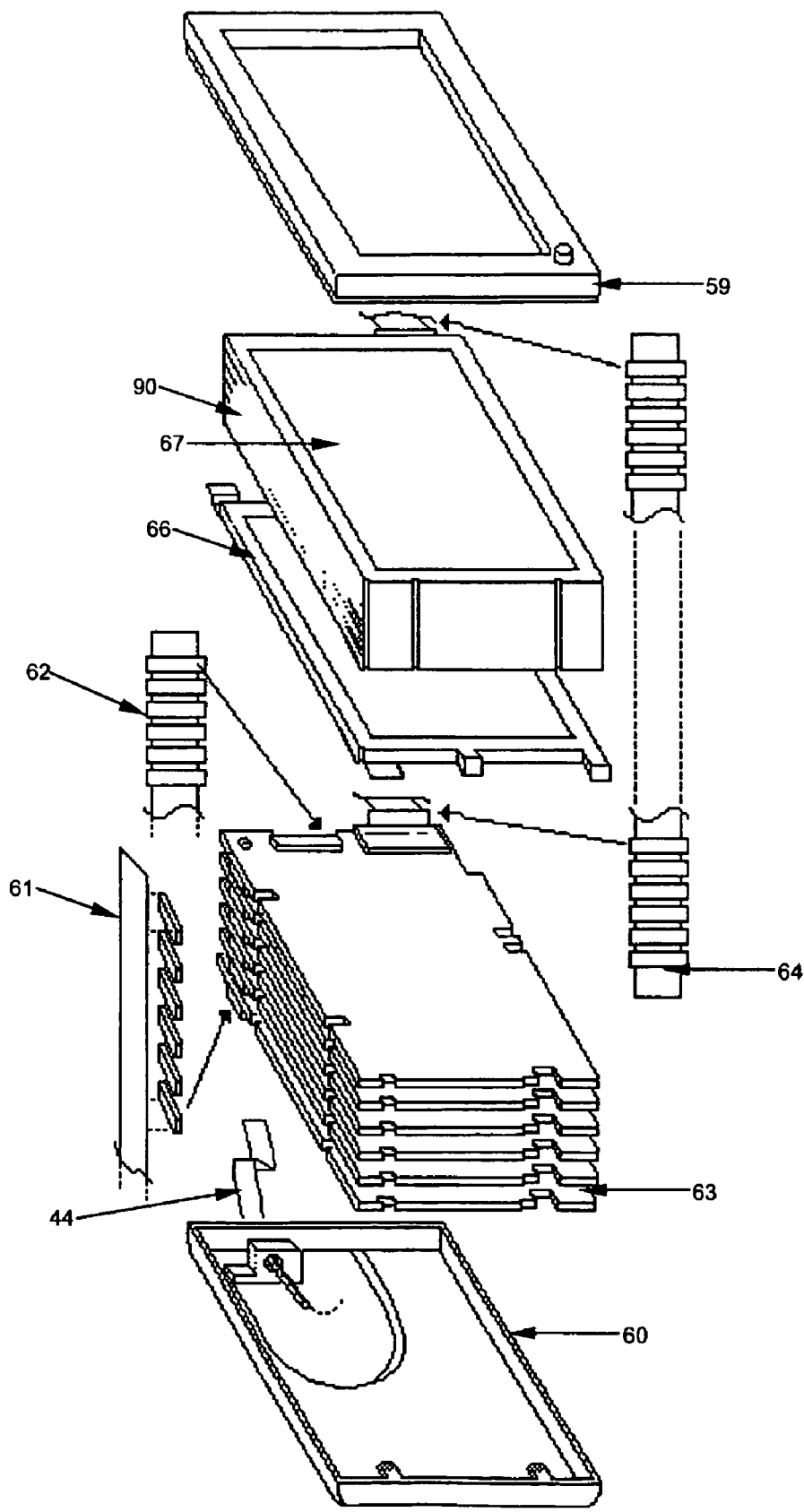
Figura 11

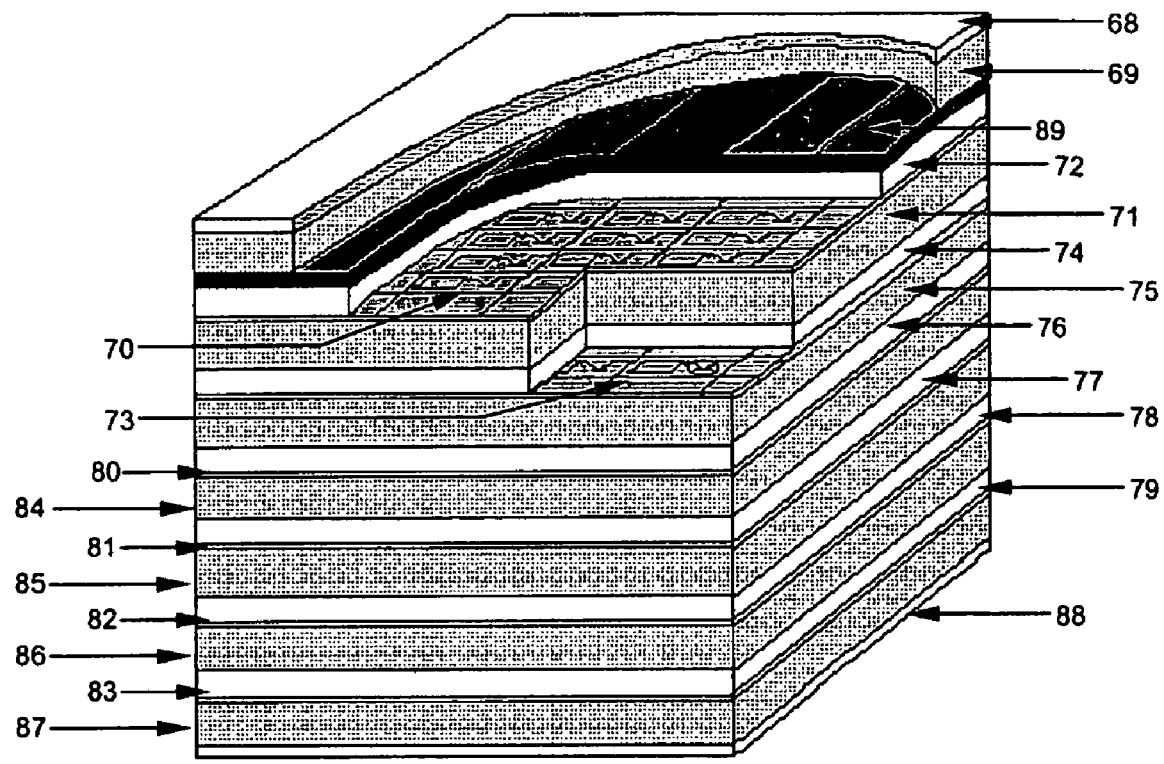
Figura 12

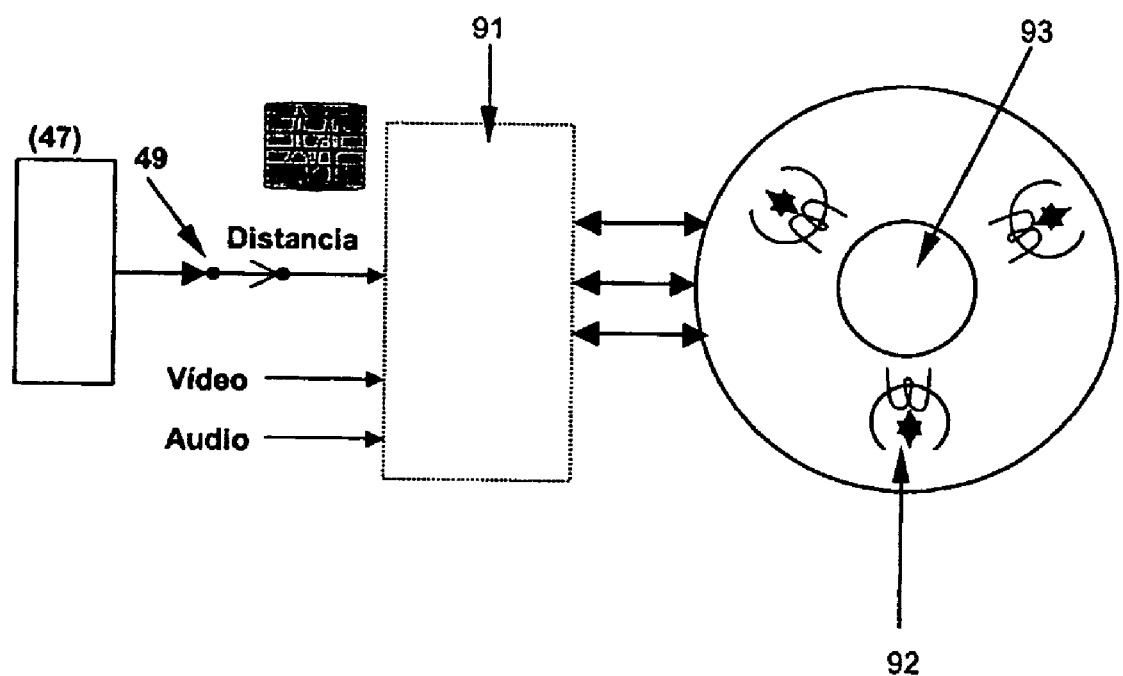
Figura 13

DEVICE FOR PRODUCING THREE-DIMENSIONALLY-PERCEIVED IMAGES ON A MONITOR WITH MULTIPLE LIQUID CRYSTAL SCREENS

BACKGROUND OF THE INVENTION

1. Field of the Invention

The present invention relates to a device for obtaining colored video images having a three dimensional effect, and particularly to a device for producing three-dimensionally-perceived images on a monitor with multiple liquid crystal screens.

2. Description of the Related Art

Some of the known techniques to have colored video images with three dimensional (3D) effect, are generated by computer, adding perspective on the plane and shading the images, as in the virtual reality technique as in the computer animation, or in the images simulation by computer, adding color to topographic cartoons (commonly in submarine images obtained by sonar techniques), but in these cases, the images are displayed on a flat (or almost flat) screen device with only one image, as in the traditional cathode rays tube (CRT) or the Liquid Crystal Display (LCD) screen, which uses technologies such as Thin Film Transistor (TFT, or Passive Matrix Technology), therefore the liquid crystal display's design and manufacturing are oriented to the flat screens, however, these methods for three dimensional simulation on a flat screen make impossible to display images with a real three dimensional or relief perception. Among the existing techniques trying to solve the perception of flat video images and to achieve a three dimensional appearing image, there are methods such as generate stereoscopic images, which consists in to have two exposures of a flat images from the same recorded or photographed object taken in two lightly separated angles (roughly 6.5 cm apart), and sometimes including a third image, which are viewed at the same time on a special glasses with filters to prevent the viewing of one or the other images, or well by using a flat LCD screens, where is displayed a separated image for each eye, and by simultaneously catching the two images from different angles, in the viewer's brain a stereoscopic image perception is produced, and then simulating an only image with the resulting visual perception of relief or depth.

On the other hand, in order to transmit and receive three dimensional appearing images on direct (or in real time) with no special glasses, some firms on the televise media applications development, has been experimented with the holographic projection technology, also with the stereoscopic projection which uses special glasses, with the images projection on plasma screens, and the images projection on a LCD screen that filters the light in order to each image is caught by one of the viewer's eyes, but all these techniques and the corresponding designs are expensive and not very practical commercially, therefore at the present, a practical and attractive way to record and transmit video images in real time (or direct) with a three dimensional perception, is not achieved.

In order to solve these and other drawbacks, in the present invention the use of a color digital video camera working together with a sonar system is proposed, where the signals from the two systems are transmitted to an electronic system which contains a logic circuit formed with integrated circuits. In such a camera the conventional flat screen is replaced by a device with several overlapped LCD screens, in order to achieve the displaying of video images with three dimensional or relief effect; the magnetic tape recording system is modified in order to store the audio signal as recorded by the camera microphone, the video and the depth signal, all in the same magnetic tape device.

SUMMARY OF THE INVENTION

With the device of the present invention for producing three-dimensionally-perceived images, the images are filmed and recorded by a conventional digital video camera, and at the same time an active sonar system is used in order to define the distance or depth to the filmed objects. With the registered signals from the camera and the sonar system, which has the video images and the depth information of the filmed objects, the device of this invention generates signals of new images, which corresponds to the different three dimensional planes that composes each image, to be displayed on a multi-layer transparent liquid crystal screens device, where the different screens are overlapped, and by displaying at the same time the superposed images only one three dimensional video image perception is provided.

These and other features of the present invention will become readily apparent upon further review of the following specification and drawings.

BRIEF DESCRIPTION OF THE DRAWINGS

FIG. 1 is a frontal view of the device for producing three-dimensionally-perceived images according to the present invention, which includes a video camera and a sonar system.

FIG. 2 is side view of the device of FIG. 1.

FIG. 3 is a perspective view of the sonar system.

FIG. 4 is a drawing of a sonar module used in the present invention.

FIG. 5 is a schematic diagram of the sonar module shown in FIG. 4.

FIG. 6 is an electronic schematic diagram of a sonar pulses scanning circuit.

FIG. 7 is an electronic diagram of an echo pulses counter circuit.

FIG. 8 is an electronic diagram of a vertical and horizontal signals synchronizer circuit.

FIG. 9 is an electronic schematic diagram of a display device to reproduce recorded video images.

FIG. 10 shows a first embodiment of a multiple overlapped LCD screens device.

FIG. 11 shows a second embodiment of a multiple overlapped LCD screens device.

FIG. 12 is a perspective view of a compact block of independent overlapped LCD screens shown broken-away and partially in section.

FIG. 13 is a schematic diagram of a recorder and player system with three tracks to record the video image together with the depth and audio signals.

Similar reference characters denote corresponding features consistently throughout the attached drawings.

DESCRIPTION OF THE INVENTION

The present invention consists in an apparatus composed by an electronic components array, as the integrated circuits, which hands each original image recorded by a conventional color video camera, and defined in a RGB format (which means, with the information to active or inactive the pixels on a color LCD screen, where the images recorded by the camera are integrated), will be divided in several images, and each new image is synchronized with the sonar signal, which were registered at the same time during the recording, by having a sonar system above the lens of said camera. Such a sonar system develops an acoustic scanning with an ultrasonic frequency over the objects which are recorded by the camera, and defines the existing distance or depth between every one of the sonar transmitters and several points on the recorded objects. The electronic apparatus modifies each video image accordingly to the corresponding distance or depth level, generating new signals of video images in RGB format, where each one of them corresponding to a certain distance level, as recorded by the sonar.

In order to display at the same time the overlapped video images corresponding to the several distances or depth levels, a display device formed by several independent transparent color LCD screens is proposed as a part of said apparatus, where such screens are overlapped and aligned very close together one behind the other, having each one of them a position according to the sequence of the distance level as registered by said a sonar system, wherein each screen displays an image which represents a specific depth plane according to the recorded objects. By displaying at the same time the images on the different overlapped LCD screens, an overlapped images block as layers is formed, which is perceived in whole as only one three dimensional image. Such a device with several screens replaces the conventional flat screen in said video camera. So then, a viewer will see on the device only one colored video image with movement, which is formed by the different overlapped images displayed at the same time, and clearly noting that some of the images are near than others with respect to the viewer, corresponding each image to a specific depth level, displaying an image with three dimensional perception and appearance, composed by the several overlapped images as depth layers. In such a camera, the magnetic tape recording system is modified in order to save in a same magnetic tape device the audio, video and also the depth information. The features and details for this video system, to record and play the video images with a three dimensional perception, are explained in the following description, and with the purpose of a better understanding of the present invention features, are attached as integral part the thirteen drawings showing separately each component piece of the system, following the same reference signs to indicate the pieces and drawings as shown.

The electronic components in the present invention are considered: in ohms at 1% accuracy at ¼ watt to the resistors, microfarads to the capacitors, and volts the level voltages; integrated circuit used in this invention are determinates according to the factory recommendations, and the input and output gates (known as pins) are connected as is showed in the respective drawings. The power and voltage levels required to the circuits and the sonar system components, are taken directly from the power supply in the video camera, and carried out by an internal cable 43 until the interface 5, so then, is recommended to change the conventional power supply in the camera by another with at least 25% more power. The wiring between the electronic components is made by mean of conductors (flexible multi-cable), male and female connectors, interfaces, and printed circuit board.

DETAILED DESCRIPTION OF THE PREFERRED EMBODIMENTS

The video apparatus with the three dimensional display perception, related in the present invention, makes use of a conventional video camera, as shown in FIG. 1 with number 1 in a front view, and in FIG. 2 in a side view (with dimensions: 59×12.9×11.8 cm), which I took as example to describe the present invention.

As is showed in FIG. 1 and in FIG. 2, over the camera 1, an external sonar system 2 is attached, with the possible dimensions: 10×8×12 cm, which is detailed in FIG. 3, which is installed inside the box 3 with the above said dimensions, which can be made with the same plastic material of the video camera body. In order to make space on said video camera 1 to the features described in the present invention, in the case of the microphone or some other camera accessory is on the top of the camera, the position must be changed, as the microphone 4, positioning to a side on the camera, as shows in FIG. 1, having a free space on the top of the camera, in order to attach an interface 5, which is switching the sonar device 2 to the video camera 1. The sonar system components works feeding by the camera power supply. Such sonar device 2 is coupled to be mounted and dismounted to the camera 1, using a rail shoe 6 in the box base 3, by making use of the counterpart to attach accessories which is normally available in an original camera, in this case used to fix the sonar system on the camera, and also supported on four gums 7 on the box base 3, in order to reduce the vibration between the sonar system and the camera.

On a side face of the sonar system 2, a control pad 8 is attached, properly labeling according to the function of each button, and the corresponding components are mounted on the printed circuit board 9, which can to have the dimensions 6×2 cm, where the sonar system manual control buttons are concentrated. Such a printed circuit board 9 is wired to the other sonar system components in the multilayer printed circuit board 10 by using a flexible connector 11, as shown in FIG. 3.

To include an electric fan 12 in the back plane of such a sonar system is recommended, which is directly powered from the power supply in the same camera by using the interface 5, which has connected the flexible wire 13. When such fan is functioning, it makes air circulation inside the sonar system, delaying the heating of the components. In order to help to the internal ventilation, little perforations (slots or holes) 14 are made on the box 3 side walls, as shown in FIG. 2.

Description of the sonar system: In order to perform the acoustic scanning or sampling with the sonar device 2 over the objects which are recorded with a camera, an ultrasonic acoustic transducers array 15, all them aligned to a same distance.

In order to explain this description, is considered as an example twenty transducers located at about 1 cm. one of the other, in a rectangular shape with four horizontal rows and five vertical columns, where they are fixed on a printed circuit rectangular plate 16 (which can be of 5×7 cm), and are switched to the sonar system components. As shown in FIG. 1, the ultrasonic transducers array 15, is oriented to the front of the sonar system, in the same direction to the lens 17 in said a video camera 1 is oriented, with the transducers oriented to the same recorded objects. With twenty transducers is having a depth scanning resolution of twenty points for a corresponding recorded frame.

As shown in FIG. 3, in front of the transducers a plate 18 is installed, with 1 cm thick as example, prepared with twenty fretwork cavities to the way of little parabolics 19, with 0.7 cm diameter and 0.5 cm depth, which are as directional acoustic collector to each transducer, in order to guide to the front the acoustic signals to each transducer, and preventing in a good grade the interference between the several transmitted and received signals, during as the transmission as the reception.

Sonar module description: In FIG. 3 an internal diagram 2 of the sonar module is shown, with the internal array for the electronic components. There are a plenty of active sonar modules in the market which can be surely used as a base to build the depth measurement device, which is a required parameter in the present invention. In order to describe the present invention, the sonar module 20 shows in FIG. 4 is taken as an example, and the corresponding schematic diagram in FIG. 5, which is short in size (5.644×4.516 cm), and with a good accuracy in distance measurements and functioning with TTL voltage levels.

Every acoustic transducer 15 on the plate is switched to its own independent sonar module 20, with the corresponding pins identified as E1 and E2 in each sonar module, where arrives the transmitted and received signals. In order to make practical the components array, it is possible to mount the twenty sonar modules in pairs on ten printed circuit boards 21 with the same size (6×11 cm), which are located inside the box 3, aligned behind the plate 16 and with the transducers. Each printed circuit board is switched to the pins in a connector 22, corresponding one of them for each printed circuit board 21, which are installed on the other face of the same printed board 16.

When the sonar module is functioning, each one of the transducers generates a pulse train with sonar frequency, and twenty waves are simultaneously emitted toward the objects and adjacent space, performing an acoustical scanning on the objects where the camera lens 17 is pointing. Each transducer is an ultrasonic waves transmitter and receiver, and when the emitted waves hit to the objects, part of the waves will rebound and will back as an echo to the corresponding transducer where they were generated, and thus it is functioning as an ultrasonic sensor, so then the complete matrix detects almost simultaneously the reflected waves by every piece on the recorded objects, registering the information from each received wave as echo in order to define the distance in twenty different points on the sampled and recorded objects.

Each sonar module 20 is able to measure distances from 6 inches (15.24 cm) to 35 feet (10.67 m). Such module is able to differentiate echoes from objects that are only three inches (7.62 cm.) apart. Each module includes the digitally controlled-gain, variable-bandwidth amplifier minimizes noise and side-lobe detection in sonar applications. The module has an accurate ceramic-resonator-controlled 420 KHz time-base generator, as example. Each sonar module has as an ultrasonic source a low frequency oscillator that produces a transient short, promoting on each sensor transducer or elastic electrode 15 a mechanic oscillation, and transmits output an ultrasonic train with sixteen cycles at a frequency of 49.4 kHz, as example, to the object to be recorded. In order to diminish the interference between the transmitted acoustic signals, is possible to change the transmission (and reception) frequency for each sonar module with about 15 Hz difference between them, and every transducer will transmit a specific frequency different to the one for the other transducers. In order to define the correspondence between the recorded image frame and the points registers by the sonar system 2, a manual calibration is possible.

FIG. 6 shows the first section of the electronic diagram to one of the twenty sonar systems, having the same to the others. When the camera power button is turned on, is possible to turn on the sonar system 2, with the switch 23, identified as INT-1, which is installed on the printed circuit board 9, and turning on allowing that the sonar modules 20 are powered by the power supply with normally 5 volts, identified as Vcc. After applying power a minimum of 5 milliseconds must elapse before the sonar system to be used, during this time, all internal circuitry is reset and each internal oscillator stabilizes.

The multi-layer printed circuit board 10, is connected to the printed circuit board 16 through the connector 24, which is installed to the end of the connectors 22, on the circuit board 16. Electronic components showed in FIG. 6, are installed in both faces of the circuit board 10. FIG. 6 shows in the beginning a staring circuit array, which starts the sonar transmission. Such a starting circuit is configured by a resistor R6, a resistor R7, a capacitance C6 and a resistor R8. This staring circuit is electronically actives with the switch 25 INT-2, which is turned on, enable that electrical signal in one terminal of the resistor changes from a low state to a high state (5 volts or Vcc), so then the starting pulse is generated and the sonar device starts the function. Such a pulse is transmitted as a starting signal to the gate 2 in a timer integrated circuit 26, with an "Astable" array, which generates a constant pulse, where the period of each pulse is defined by the array of components (R9, R10 and C7). Duration of each generated pulse in the gate 3 in the integrated circuit 26, is defined as example in 1.5 milliseconds, that is enough time to measure until 40 m. in distance from the sonar system, so then with this parameters, maintaining fixed the camera at less during 1.5 millisecond is recommendable, in order to do not have distorted images.

Such generated pulse in the gate 3 from the integrated circuit 26, could be interrupted before such 1.5 milliseconds period is fulfilled, if is received by the gate 4 (Reset) a signal in a pulse form (from 0 to 5 volts) and restart this circuit. Such pulse occurs when all the said transducers have received its corresponding echo signal, and is not necessary to wait that said 1.5 millisecond been finished. Generated pulse in integrated circuit 26, the gate 3, is carried out to each one of the start gates, identified as "INIT" in each of the twenty sonar modules 20. When in each INIT gate from each one of the twenty sonar modules, is detected an high voltage level signal, a pulses transmission is generated by the terminal E1 (XDCR), which is connected to the respective a acoustic transducer 15, exiting each one, so then each transducer emits a sixteen pulses sequence with 49.4 KHz with 400-volt amplitude, sending outside the ultrasonic waves through the cavities to the way of little parabolics 19. After the sixteen transmitted pulses sent by each transducer, a 200 volts remaining on the transducers, which is eliminated by each sonar module. The waves go out through the cavities 19, and only is necessary to wait for the return of the transmitted signal as echo.

Each acoustic signal is receipt and detected by the respective transducer as a first echo signal, which are converted in an electrical pulse by the transducers and amplified in each sonar module, and carried out from the respective terminal, changing from the low level voltage (0 volts) to the high level voltage (5 volts). Each register signal for each sonar module, is carried out to the gate 5 (identified as "R"), in the respective integrated circuit 27, which have four electronic latch "RS" (Reset-Set).

Pulses detection to the distances measuring: As is shown in FIG. 6, in each circuit for the respective transducer, starting pulse (INIT) is also carried out to the each of the gates identified as "S" in the corresponding drawing of one of the five integrated circuits 27, configured as a "RS" array, while the echo signals detected coming from each sonar module, are carried out to the gate 5 identified as "R" in the same integrated circuit 27. The starting pulse change from a lower to a higher voltage level when the starting pulse is detected and stored by some time, until a echo signal is receipt, and the pulse go back to the ground level.

This transforms the time difference between both incoming signals in only one pulse, during from the INIT signal to the echo detected signal, so then, the gate identified as "Q" in each integrated circuit 27, having the required time to the each ultrasonic wave goes to the filmed object an comeback to the respective acoustic transducer, that is proportional to the distance from the transducer to some point on the object, in according to the "pulse-echo" method. Considering in average that an acoustic signal travels 1 feet in 0.9 milliseconds, approximately a speed of 338.7 m/sec going and backing, distance is calculated from the known speed (approximately 330.8 m/sec. form 0° C. to 20° C.), according with the formula: distance=speed×time.

Sonar pulses scanning: As shown in FIG. 6, in order to count each pulse detected in each gate "Q" coming from each RS latch circuit 27, such pulses are transmitted to one of the corresponding AND logic gate in the integrated circuit 28, while a square pulses sequence is receipt in the other input gate. As is shows in FIG. 6, such constant frequency is generated by the integrated circuit 29, which is configured as a pulses generator array (which can be TTL or clock pulses), generating such square wave with constant frequency of 2.5 KHz, as example; so then from the INIT to the echo signals, duration is divided or scanned on air graph of 0.0025 mm maximum definition. Accuracy only depends of the used sensor and the environmental conditions. Such ultrasonic system measurer always works with a constant air graph definition of 0.0025 mm by default.

Echo pulses counter: In order to have the transducers available to other transmission cycle, the detected echo pulses are counted, and when such counts is equal to the number "twenty" (in this example), it means that all the sonar modules has been completed its reception. FIG. 7 shows that each one echo signals generates by each sonar module 20, are connected to the same point trough a respective diode into the diode array 30, which avoid possible interference between the echo gates, which is connected to the gate 2 of an integrated circuit 31, which is a four bits decade counter, and connecting in parallel to the another same integrated circuit 32, using the respective carrier gates, in order to have an eight bits echo signals counting during the acoustic scanning. Such eight bits counted number is taken from the eight bits counter output gates, which is carried to the logic circuits (33 and 34) array, each one with an AND logic gate, wherein said echo detected quantity is counted and compared with the number "twenty" as a binary quantity, which is previously programmed trough the specific pins connected to the ground or 5 volts, in order to obtain the (101000) array.

The pulses from each AND gate are carried out to the input gate in the integrated circuit 35. When all input gates have an high voltage level, an inverted pulse is generated, so then such pulse is again inverted by the inverter circuit 36, changing to an high voltage level (Vcc). Such signal is transmitted to the one of the input gates in the integrated circuit 37, which is an OR logic gate, and generates an reset pulse, which is carried out to the integrated circuit 26 gate 4 before that said 1.5 milliseconds period is finished, in order to interrupt the pulse generated by the output gate 3, and to finish the scanning pulse. Such generated reset signal is again inverted by other input gate into the 36 integrated circuit, in order to send it to the electronic elements that requires. In the other input gate from the integrated circuit 36, coming the starting signal from the starting circuit, which generates a inverted pulse from the 1.5 milliseconds pulse produced by the integrated circuit 26, so then the restart signal is also generated if scanning period is finished.

After the pulse coming from the integrated circuit 26 gate 3 is interrupted, signal go back to the low voltage level. The transducers which do not detects an echo signal, and the counted of detected echo pulses are not the quantity of "twenty" when the 1.5 milliseconds is finished, the maximum time (1.5 milliseconds) is assigned for them, which means a most distant position on the recorded image. To restart said cycle, the integrated circuit 26 will produce a new 1.5 milliseconds pulse by the INIT gate, a new sixteen pulses transmission is generated from each transducer.

Sonar pulses counting to the distances define: As is showed in the FIG. 6, when the 1.5 millisecond INIT pulse is generated by such integrated circuit 24 gate 3, allows to the constant frequency of 2.5 KHz. is receipt by one gate of the AND gate 26. In each AND gate, is having the separated waves in a several square pulses which are possible to count. Such pulses resulting from each AND gate are carried out to the integrated circuit 38 gate 2, four bits decade counter, and connecting another same integrated circuit 39 in parallel, using the respective carrier gates, connecting from the circuit 38 gate 15, to the circuit 39 gate 2, in order to have an eight bits counting, wherein more pulses counted means an object with a major distance, and vice versa. The pulses counting is represented by eighth bits binary numbers All the calculus in the sonar system are considering an arithmetic with eight bits, however, is possible to use another bits quantity for the logical calculus. In the counters, each pulses counted is carried out to one of the twenty respective integrated circuits 40, which works as a storing "Latch" with a third state gate (as high impedance state), in order to store the eight bits quantities, until the third state gates I are enabled, so then the depth information is transmitted.

FIG. 8 shows the components and its connection, which are installed on the multi-layer circuit printed board 10, representing a Shift Register array made by ten integrated circuits 41, wherein each one has two called "Flip/Flop" JK circuits.

In order to synchronize the twenty pulses generated by such Shift Register array and the video synchrony pulse, a clock pulse is generated by the frequency division of the signals identified as "V" (vertical) and as "H" (horizontal), both signals which are taken from the RGB decoder circuit 42 from the video camera, connecting the 46 and 47 pins to the internal wiring 43, which is splits in three sections 44 in order to connect to the interface 5 on the camera. From the sonar system, internal wiring 13 is connected to the printed circuit board 10, and so to the electronic components, as shown in the FIG. 9. Horizontal signal (H) produced by the said camera hardware, is carried out to the frequency divisor array 45, which is formed by two BCD cascading counters integrated circuits, and with the appropriate array, considering the camera sweep, divides such signals the necessary times in order to generates a signal called "Hp", which as example, have five pulses by horizontal sweep, which corresponds to the five transducers for each horizontal line. At the same way, other frequency divisor array 46 formed by two BCD circuits, internal vertical signal "V" taken from the camera, is divided until generates four pulses (as example) in correspondence to the "V" signal, which corresponds to the four vertical transducers in each vertical line or column, so then, the correspondence between the transducers and determinates matrix array of pixels from the object image is defined, and the vertical and horizontal pixels position, are synchronized to the video signals.

When the restart pulse is received by the first integrated circuit 41 gate 4, each one of the output gates identified as "Q" (from Q1 to Q20), changes from a low voltage level to a high voltage level, and generates twenty signals in sequence, which are carried out to the latch circuits in order to hand enable the third state (high impedance) gate which allows the stored data transfer, according to the video images seeped.

The stored information in eight bits binary numbers from each distance counted, is carried out orderly and in turns to the data bus 141 which is connected to the Digital to Analogical converter (D/A) integrated circuit 47, through the gates 142 as is shown in FIG. 9, where is also connected a timer 143 installed in the camera 1. An analogical wave is obtained in 144, in correspondence with each sweep, having the depth information and completing analogically the information between the twenty sampled points, which corresponds to the pixels in the signal of the RGB format imaging took from the RGB decoder integrated circuit 42, which is installed into the camera 1 and provides the three signals (Red, Green and Blue) 155 in such RGB format.

Pulses to the analogical signals conversion: When the twenty signals generated by the Shift register array, enabling each third state gate 1 in the latch circuits 40, information of each counted segment, and stored as eight bits numbers, is ordenatelly transferred to the data bus, which is connected to the input gates (64 to 71 pins) in a D/A—Digital to Analogical converter, using an integrated circuit which works with the camera synchrony pulses (clock pulses), having on the output gate 165 an analogical wave form which corresponds to each sweep, with the several depth levels information, fulfilling the intermediate values between the twenty points, with an analogical approximation method. The points in the analogical signal corresponds to each one of the pixels in a video image in a RGB format, taken from the camera decoder RGB circuit 42, and its signal is carried out to the sonar system trough the interface 5.

Display logical: FIG. 9 shows the electronic configuration schematic diagram to reproduce the recorded images. Switch 48, identified as INT-3 and installed on printed circuit board 9 and located in the control pad 8, the data source mode is selected to the display of the video images and depth, in recording mode or play mode. To the recording mode, which is selected by the button 49 (Start/stop) on the video camera, the eight bits signal-generated by the D/A converter 47, is transmitted directly to the A/D converter 50. When the switch 48, INT-3, is selected to the play mode, the distant and the depth information coming from the stored images reading from the magnetic tape device, and are transferred directly to the A/D converter 50.

From here, hardware works at the same way for both, recording mode and playing mode. For any of these cases, signal with depth information is synchronized with the video images trough the vertical "V" and Horizontal "H" signals, generated by the internal camera hardware, and located the corresponding vertical data (identified as "Vp") and horizontal (identified as "Hp"). The A/D converter 50 changes again each analogical wave to the eight bits binary numbers, from which in this invention are only used the three more significant bits to this description, in order to obtain the corresponding screens (six in this example), but is possible to use more bits in order to consider more screens.

In order to define a numerical correspondence between each depth level and each screen, an BCD to Decimal converter is configured, arranged with the AND gate formed by two integrated circuits array, where in each the output gate from each AND gate, are connected to a diode array 53 which works as voltage returns gates protection. A second diode array 54 connected to the output AND gates, which allows that the video signal with less significant bits are accumulated in order to display an imaging in the more distant screens. The three signal which form a complete image at RGB format, are taken directly from the camera RGB decoder 42, which generates such signals. In order to use a negative logic, required by some electronic components related in this invention, the five signals coming from said diode array 54, are inverted by an inverter circuit 55, which is used to invert the required signal in this invention.

Said signals enable or unable the base of each one of the corresponding a PNP transistor 56, which works as a switch for the three RGB signals which coming from such diode array. To each three transistor set arrives in its gate "P" the three BGR signals, with the complete image information, the corresponding signal coming from the circuits 55, and hands the RGB data transmission to be carried to the respective a display controller 63, each one is connected to a separate LCD screen. Enable or unable of pixel activation is controlled through the transistors array 56, corresponding to the same vertical and horizontal position into the RGB format. Each display controller 63 produces itself RGB imaging signal in reference to the determinate depth level, which are switched controlled by the AND gates, that allows the pixels activation or inactivation in its LCD screen. Such images separation according its vertical and horizontal position in the frame generates a copy from the original image, which is separated to display on each LCD screen. With this logic array and towards the transistors, pixels controlled activation which corresponds to the same vertical and horizontal position on each BGR image, allows to the pixels in each image that do not corresponding to a specific depth level are inactivated. Each image correspond a specific depth level. As showed in FIG. 3, BGR signals from the different images are transmitted from the printed circuit board 10, using the cable 13 to the interface 5. When sonar system is coupled to the camera, the interface 5 connects both devices, connecting into the camera with the cable 43, which is placed inside the camera and is splits in three sections 44.

Display on the LCD multi screens device: In order to display the video images recorded by the camera and the images which ate separates and filters the pixels, the conventional display device with a single flat screen typically installed in the camera is removed from the camera and it is changed by the multi overlapped screens device 57, which is externally formed by a plastic box 58, and the front 59 and back 60 covers which are as a protection, as shown in FIG. 10, where the separated pieces are detailed, installed in the camera outside and hinged with the same technique as for the camera original screen. To that same device the signals arrive from the corresponding flexible wire connector 44, which are transmitted inside the several overlapped screens device 57, by using the flexible wires 61 and 62, corresponding to the couple of connectors in every display control electronic boards 63 for LCD screens (in this example only six screens are to be considered), placed inside the box 58.

In this invention two ways to form a several overlapped LCD screens device are described. Following is described the first embodiment included in the present invention: Every video controller 63 is connected by using a flexible connector wire 64, which sends each signal with the video information in RGB format to the screens 65, installed in the front of the same LCD screen display controller boards, and having between them a fluorescent lamp lighted plate 66, which is used as a back light source for the device screens, as shows in FIG. 10. The LCD screens 65 are overlapped one behind the other very tightly with the lesser possible distance between them in order to have a compact device, as a block with several overlapped screens. Every screen has a specific place according to the recorded distance and corresponding to a certain depth level, displaying a particular image on each screen and expressing the several planes that form the recorded object. Having the overlapped screens, each screen can be considered as a layer corresponding to a depth level into the multi screens display device. So, when the images are displayed simultaneously on the several overlapped LCD screens, is produced a visual effect with depth, formed by the several images as layers, obtaining video images with an three dimensional visual perception. So, when such a device is functioning, a set of independent overlapped video images are simultaneously displayed on the several overlapped LCD screens, where each image is a part of the original image, with a position according to the corresponding depth level and expressing the several depth level layers for the recorded objects.

The amount of used screens is directly proportional to the layers amount or depth levels differences, and so, such screens amount will be directly proportional to the depth resolution. In this several screens display device, the screen at the more distant back is always displaying the complete image, as it is normally generated by the camera, in order to have it as a background for the images; while in the other screens a different image will be displayed, corresponding to the depth level that it occupies. The remaining electronic signals required by the display controlling boards, are the same for all the boards, and they are generated by the video camera across the conventional interface to be used by the several screens device.

The second embodiment for the several LCD screens device is related to the present LCD screens production technique, consisting in the setting of an electrodes plate between two glass substrate plates, which are very close together and the make a seal for the liquid crystal in the space between these plates. In base to that technique, in the present invention is proposed as a second embodiment for the several screens device the manufacture of a certain width block formed by several independent transparent LCD screens, settled as several separated liquid crystal layers, functioning as a set like an only several overlapped LCD screens device, where the closer between them the liquid crystal layers, the nearer the played images and the better obtained resolution for the images with a relief perception, and also they will occupy a lesser space inside the box 58.

FIG. 11 shows the second embodiment for the several screens device, where the screens 65 as shown in FIG. 10 are replaced by a several screens block 67, and each of them is connected to the corresponding display controller 63 with the connector wire 64. Since a lesser space is occupied by the use of such a several screens block 67, the box walls size 58 can be reduced, or also, to increase the amount of screens. FIG. 12 shows a zoom drawing in order to detail, to a pixels level, a cut for the several LCD screens plate 67 to describe the manufacturing. In order to form a compact block of independent overlapped LCD screens, the manufacturing is possible by using the TFT technology. In the same way as in the present way to manufacture a liquid crystal transparent screen, the first stage in the manufacturing of a several overlapped screens device 67 starts in the conventional way, which is to set behind a polarized film 68 a glass substrate plate 69 for one screen, and a transparent electrodes plate 70, and upon is settled another glass substrate plate 71, allowing between them to the liquid crystal 72 sealed in the narrow space between the plates. When the first LCD screen is obtained, for the manufacturing of the several screens device 67 another transparent electrodes plate 73 is settled over the previous glass substrate plate 71, and later another liquid crystal layer is settled 74, which is sealed with another glass substrate plate 75, obtaining in that way a second overlapped screen which is independent form the previous one. The adding of liquid crystal layers between the glass substrate plates is repeated until form a block of several liquid crystal independent screens 67, which is has as several layers as desired, and in this case is described in FIG. 12 a device with six liquid crystal as layers 72, 74, 76, 77, 78 and 79, covering the corresponding transparent electrodes 70, 73, 80, 81, 82 and 83, between the glass substrate plates 69, 71, 75, 84, 85, 86 and 87. The last glass substrate plate is also covered with a polarized film 88. In order to generate color images, it is only necessary to use in the several screens device an only color filter 89 in front of the first screen, that is to say, the nearest one to the viewer, or one color filter over each LCD screen. With a metallic frame 90 which is also a protection, the plates block is firmly fixed. The fluorescent light 66 in the rear of the several screens device 67, evenly illuminating all the screens from the back plane. The emitted light travels across all the screens, and crosses each thin transparent light diffuser in the screens, allowing the light pass toward the front of the screens block, and letting see the light only for the activated pixels on each screen. The resulting device is thicker than the single screen device. The display control boards for the liquid crystal screens 63 are fixed into the a metallic frame inside the box to protect and mounting, at rear to the screens block, as showed in the FIG. 11.

Recorder and player system with three tracks: In order to record the video images information together with the distance or depth detected by the sonar device and the audio signal, the conventional recording and playing system is modified, by adding an electronic array 91, formed with several circuits installed on the printed circuit board 10, with the same array as the one used in the video camera to record the audio and video signals, recording also the depth signal in the same electromagnetic recording device. By adding a magnetic head 92 around the same cylinder 93, as is shown in the FIG. 13, to record and play on a separated independent track the distance information corresponding to each pixel, contained in the way of an analog wave coming from the Digital/Analog (D/A) converter, which is switched with another branch 44 of the flexible wire 43 to the recording device 91. The camera which is the example to describe this invention, can uses a certain format type cassette for recording, but is possible to use other tape formats or any other available means for the storage data, if is to be used as a base to apply the modifications of this inventions to other digital video cameras with other magnetic tape cassette device.

When the button 49 (Start/Stop) is pushed to record in the camera to select the recording mode, the video and audio signals, and also the sonar system signal are all transmitted to the modified recording system, which acts in order to simultaneously record on the magnetic tape the depth information on a separated track, with the magnetic head in the recording system, and recording the video and audio information on independent tracks of a same recording device. When the camera is turned on, the sonar device is also powered, beginning the ultrasonic signals transmission.

Such a sonar device has a switch 23, INT-1, on the control panel to cut the power and turned it off when is not in use. The selector switch 49 in the camera defines the operational mode, and when is pushed (to select the Recording mode), the lens 17 register is recorded on the tape, but if that switched is not operated, the lens register is only watched on the screen with no recording on the tape. By pushing such button 49, the object recording starts with the video camera, and the audio signal from the microphone 4 at the camera side starts to be recorded, while the video image is caught by the lens 17, showing a flat image on the LCD screen of the camera eyepiece 94. When the button 49 is pressed, the audio, video and sonar device 2 signals are functioning.

Applications for the several overlapped screens device in video: With the use of sonar and programming techniques is possible to combine the video images in order to have information about the several depth levels in an image, generating images which are formed by the display on several screens corresponding to the several depth planes in a block made by a liquid crystal color overlapped screens device, on which the information for each screen is displayed according to the specific depth information, obtaining the stereoscopic three dimensional perception. Such a device can be used to different apparatus with the images display on a flat screen, as the case of computer devices, telephony (fixed and cellular), and video display.

This invention can be applied to display programs or video programmed technique in such display device, according to the following: Considering this new display technique on a display on a several overlapped LCD screens, this invention is also related to the visual edition for programs with a computer, with techniques such as virtual reality in combination with computer assisted animation, and instead to add to the pictures a perspective and hatching, will be displayed on each screen a different depth layer in relief corresponding to the desired perspective, or selecting by a switch in order to program in the same way the computer images by adding color to the bas relief topographic cartoons, specifically in the application for the display on the several overlapped LCD screens device as described in the present invention, By considering the above mentioned, is possible to program the depth information in order to add it to the flat format existing films in order to obtain three dimensional video images from the flat format films, using computer programming methods, defining the images separation and is handling the display of each pixel in each video image in order to have a correspondent to the different planes in the multi screens device, or generating both, the video images and the depth data by computer, trough animation by computer techniques or virtual reality format.

Another possibility for the use of acoustic signals in combination with filmed images, is that the light and sound speeds are different, and the displayed images on a real time basis are better for low movement takings, which is possible to excel by the use of faster circuits for the acoustic signals. But in case of programming the depth signals from the flat format films to separate the images, or in the programming of images with the depth information, as in virtual reality, there will not be any restriction for the speed of the displayed objects.

What is claimed is:

1. An electronic device used to process signals, which is featured by:

multiply a certain times one image signal from an original video image of an object which is recorded by a video camera, and thus obtaining several images equal to the original image, and every image is differently processed in order to change its information accordingly to the corresponding defined distance between several points on the recorded object and the camera, in order to activate or inactivate the corresponding pixels in each image obtained from the original image, and thus generating new and different images which are displayed on multiple overlapped transparent LCD color screens formed as a block in a solid graphic display device;

to modify each video image accordingly to the corresponding distance or depth range, generating new video image signals in RGB format, where each new video signal is corresponding to a certain distance level;

the application for the visual edition of computer programs in order to obtain three dimensional images on the block of multiple overlapped transparent LCD color screens from the existing flat format recordings video images, by programming the depth information to add it to a certain depth plane, and directing the display for each pixel that forms the video image in order to make it correspond to the same plane, or also to create wholly the video images and the depth data with a computer, by using computer aided animation or virtual reality techniques; and to be used as an interface for the video and depth signals that uses the solid graphic display device comprising the multiple overlapped color screens.

2. A device to process several sonar or dept signals, which is featured by:

to perform a simultaneous sampling of distances over several points on the surface of one or more object to determine the existing distance between the several points on that objects and the sonar device;

to convert to an only one analog or digital signal the several signals of the distances sampled by a sonar system, where such signal contains the information about the depth for the several points of the objects;

to count the amount of acoustic waves which are detected by said sonar system, and to compare the count with a certain integer number;

to use a flat or curved plate prepared with several fretwork cavities to the way of little parabolics as directional acoustic collector, in order to guide to the front the transmitted or received acoustic signals; and to be used to provide with the depth signal information which is used by a solid graphic display device comprising a block of multiple overlapped color screens.

* * * * *